(12) United States Patent
Wu

(10) Patent No.: US 7,347,121 B2
(45) Date of Patent: Mar. 25, 2008

(54) GRIP FOR FITTING OVER HAND-HELD ARTICLES

(75) Inventor: Guang-Huei Wu, Taichung Hsien (TW)

(73) Assignee: International Bicycle Products Corporation (TW)

( * ) Notice: Subject to any disclaimer, the term of this patent is extended or adjusted under 35 U.S.C. 154(b) by 263 days.

(21) Appl. No.: 11/203,967

(22) Filed: Aug. 16, 2005

(65) Prior Publication Data

US 2007/0039407 A1 Feb. 22, 2007

(51) Int. Cl.
*B62K 21/23* (2006.01)
(52) U.S. Cl. .................................... 74/551.9
(58) Field of Classification Search ............... 74/488, 74/489, 551.1, 551.9; 16/421, 430, 431, 16/436; 81/427.5, 489, 177.1
See application file for complete search history.

(56) References Cited

U.S. PATENT DOCUMENTS

| 604,706 | A | * | 5/1898 | Wiens et al. ............... 74/551.9 |
| 1,235,309 | A | * | 7/1917 | Garretson ..................... 38/95 |
| 3,189,069 | A | * | 6/1965 | Stowell ..................... 81/177.1 |
| 4,416,166 | A | * | 11/1983 | Jannard et al. ............. 74/551.9 |
| RE32,747 | E | * | 9/1988 | Ullmann et al. ............. 200/505 |
| 5,280,735 | A | | 1/1994 | Kuipers et al. |
| 5,730,662 | A | * | 3/1998 | Rens ........................... 473/300 |
| 5,823,069 | A | * | 10/1998 | Roark et al. ................ 74/551.9 |
| 5,893,297 | A | * | 4/1999 | Rowe ........................ 74/551.9 |
| 6,471,433 | B1 | * | 10/2002 | Lee ............................. 401/195 |
| 6,925,906 | B2 | * | 8/2005 | Kwag ........................... 74/523 |
| 7,013,533 | B2 | * | 3/2006 | Lumpkin ..................... 16/421 |
| 2007/0113380 | A1 | * | 5/2007 | Lee et al. ..................... 16/431 |

* cited by examiner

*Primary Examiner*—Vicky A. Johnson
(74) *Attorney, Agent, or Firm*—Browdy and Neimark, PLLC

(57) ABSTRACT

A grip includes a first body member and a second body member. The first body member has a tubular body with an inner surface and an outer surface. The inner surface of the tubular body includes a groove having a bottom wall with a plurality of openings. The second body member has an outer portion, a connecting portion and an inner portion. The outer portion of the second body member is located on the outer surface of the tubular body for forming a shock absorbent layer thereon. The inner portion of the second body member is received in the groove of the first body member for forming an antislip layer on the inner surface of the tubular body. The connecting portion is fitted in the opening of the tubular body.

10 Claims, 2 Drawing Sheets

GRIP FOR FITTING OVER HAND-HELD ARTICLES

BACKGROUND OF THE INVENTION

1. Field of the Invention

The present invention relates generally to a grip of hand-held articles, more particularly, to a grip for fitting over a handlebar of cycles or the like.

2. Description of the Related Art

Grips are commonly designed to fit on the gripping section of the hand-held articles for increasing comfort or shock absorption during gripping of the hand-held articles. Prior art grips usually have a unitary underlying support structure sufficiently rigid to retain the shape of the grip. A problem with these grips is that they could not adhere sufficiently to the gripping section of the hand-held articles, thus allowing relative slippage between the grip and the gripping section of the hand-held articles.

In an attempt to eliminate the problem of relative slippage between the grip and the gripping section, U.S. Pat. No. 5,280,735 has disclosed an improved two piece grip which can be securely attached to a bearing surface, such as a handlebar. The grip utilizes a two piece construction which comprises a pliable inner sleeve and a rigid outer housing. The rigid cylindrical outer housing is adapted to be coupled to the exterior periphery of the inner sleeve such that the outer housing applies a gripping force to the inner sleeve, and the inner sleeve applies a holding force to the handlebar, or other bearing surface, to prevent the grip from rotating on the handlebar. In other words, such a grip can substantially reduce relative slippage between the grip and the handlebar.

A problem with the grip mentioned above is that the inner sleeve thereof is so pliable or soft that it has a high coefficient of friction. The result is that the inner sleeve may stick to itself and wrinkle during insertion, further impeding insertion over the hand-held article. A further disadvantage of the prior art grip is that it is difficult to reside the supports of the outer housing in the spaces between the protrusions of the inner sleeve, when the outer housing is coupled to the inner sleeve.

Thus, it would be desirable to provide an improved grip that can eliminate the relative slippage between the grip and the gripping section but that also can avoid all of the just discussed shortcomings of prior art grips.

SUMMARY OF THE INVENTION

In accordance with the principles of the present invention, a grip constructed for fitting over a handlebar or the like comprises a first body member and a second body member. The first body member is made of rigid materials and shaped to fit over the handlebar. The first body member includes a tubular body having an inner surface and an outer surface. The inner surface of the tubular body forms at least a groove thereon. The groove has a bottom wall with a plurality of openings. The second body member is made of pliable materials and has an outer portion, a connecting portion and an inner portion. The outer portion of the second body member is located on the outer surface of the tubular body in such a way that the outer portion is to be a shock absorbent layer on the outer surface of the tubular body. The inner portion of the second body member is received in the groove of the tubular body in such a way that the inner portion is to be an antislip layer on the inner surface of the tubular body. The connecting portion is fitted in the opening of the tubular body to connect the outer portion and the inner portion of the first body member.

BRIEF DESCRIPTION OF THE DRAWINGS

Further objects and advantages of the present invention will be better understood from the detailed description taken in conjunction with the accompanying drawings, and in which.

DETAILED DESCRIPTION OF THE INVENTION

Figure 1:
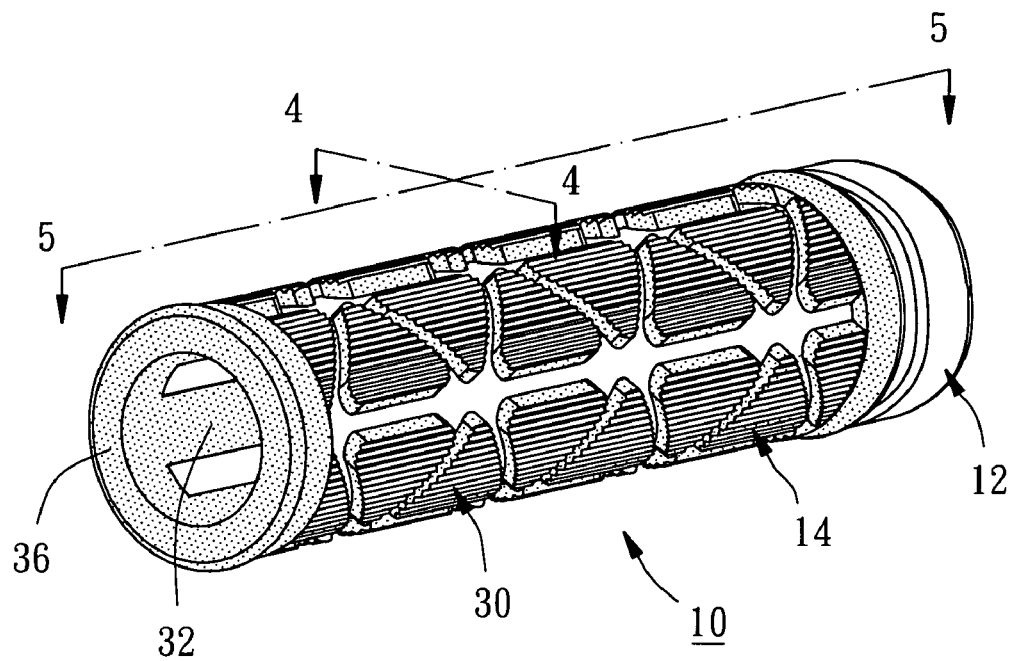
FIG. 1 is a front perspective view of a grip in accordance with the principles of the present invention.
Figure 2:
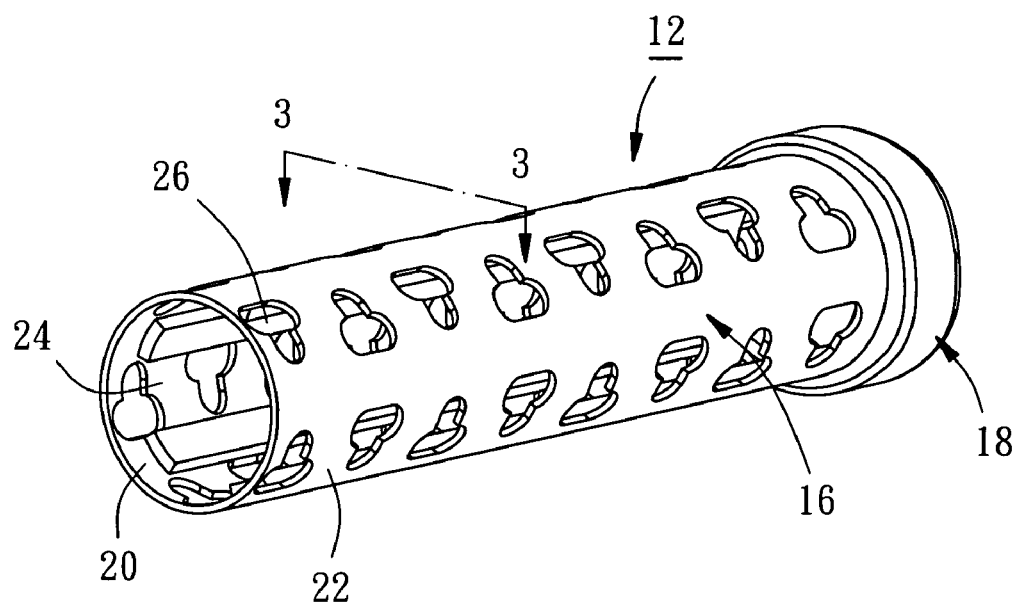
FIG. 2 is a front perspective view of a first body member of the present invention.
Figure 4:
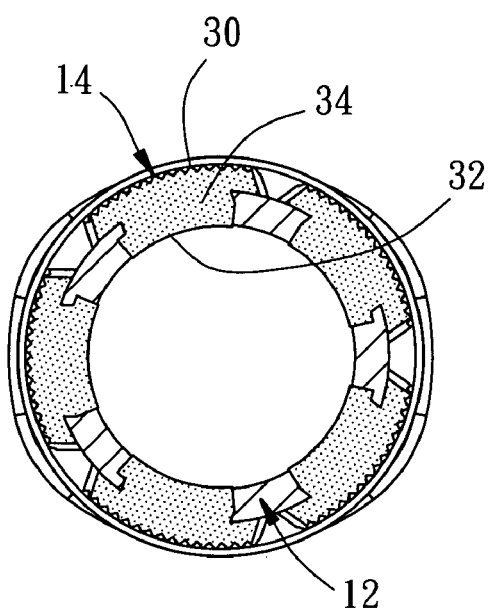
FIG. 4 is a cross-sectional view taken along the line 4-4 of FIG. 1.
Figure 3:
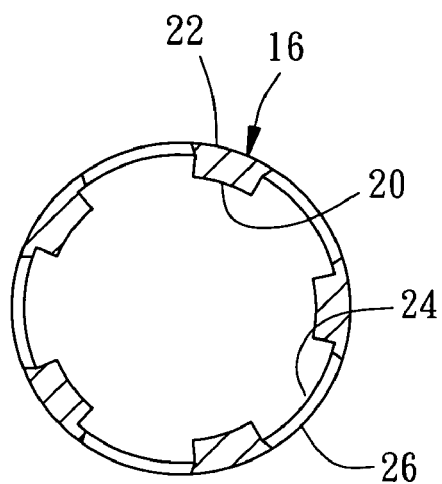
FIG. 3 is a cross-sectional view taken along the line 3-3 of FIG. 2.
Figure 5:
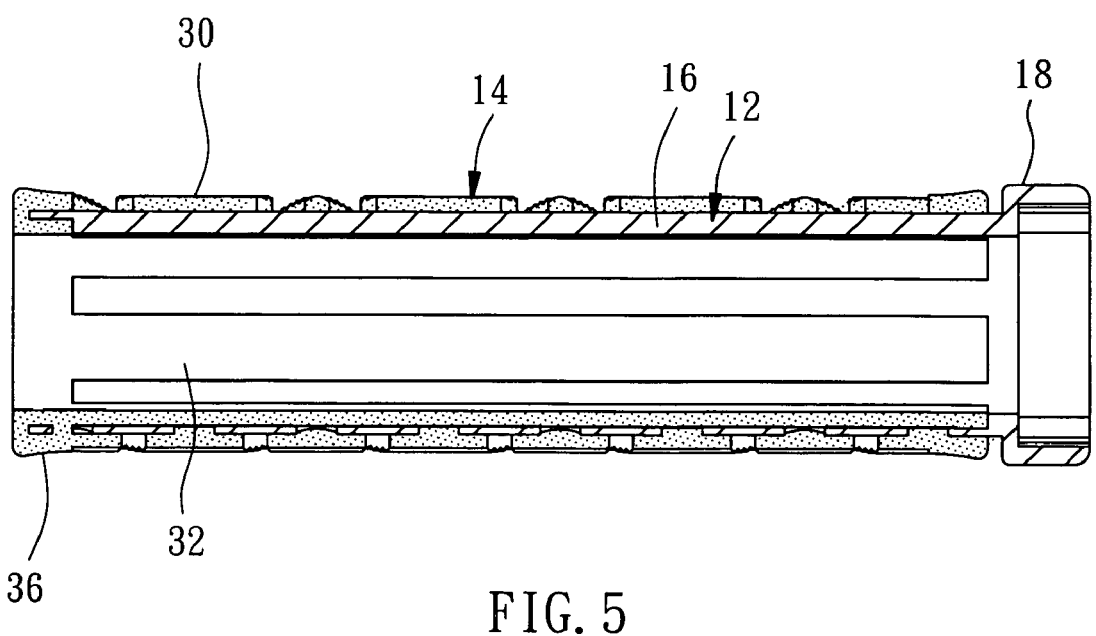
FIG. 5 is a cross-sectional view taken along the line 5-5 of FIG. 1.

Referring now to the drawings, there is shown a front perspective view of a preferred embodiment of the invented grip 10. The grip 10 comprises a first body member 12 and a second body member 14.

The first body member 12 is a suitable injection molded article from rigid plastic materials, such as PP or PA, to be a unitary underlying support structure. The first body member 12 includes a tubular body 16 and an annular flange end 18. The tubular body 16 has an inner surface 20 and an outer surface 22. The inner surface 20 has five grooves 24 spacedly provided and extended along the axis of the tubular body 16. Each of the grooves 24 has a bottom wall provided with a plurality of openings 26.

The second body member 14 is also a suitable injection molded article but from pliable plastic materials, such as gel or tactile rubber. The second body member 14 includes a plurality of outer portions 30, inner portions 32 and connecting portions 34 provided therebetween.

Each of outer portions 30 has a predetermined area and thickness and is located on the outer surface 22 of the tubular body 16 in such a way that it projects outwardly from the outer surface thereof in a suitable height and completely covers the opening 26 for forming a shock absorbent layer. Each of inner portions 32 fills up the groove 24 of the tubular body 16 to form a plurality of antislip layers spacedly provided on the inner surface 20 of the tubular body 16. Each of connecting portions 34 is fitted in each of the openings 26 of the tubular body 16 to connect the outer portion 30 and the inner portion 32 of the second body member 14.

In this preferred embodiment, for forming a symmetrical structure, the second body member 14 further includes an end cap 36 shaped like the annular flange end 18 to cover on the other end of the tubular body 16. And the top surface of each of the outer portions 30 is grained for forming an antislip gripping region on the outer surface of the grip 10.

As the construction described above, for having a rigid first body member with inner pliable antislip layers, the grip of the present invention not only can be easily fitted over the grip section of a hand-held article but also can eliminate the relative slippage between the grip and the gripping section. In addition, for having a plurality of shock absorbent layers spacedly provided on the outer surface of the first body member, the grip is comfortable to be gripped.

What is claimed is:

1. A grip for fitting over a hand-held article, comprising:
a first body member made of rigid materials and shaped to fit over the hand-held article, said first body member including a tubular body having an inner surface and an outer surface;
at least a groove provided on said inner surface of said tubular body;
said groove having a bottom wall with a plurality of openings;
a second body member made of pliable materials and having an outer portion, a connecting portion and an inner portion;
said outer portion of said second body member located on said outer surface of said tubular body for forming a shock absorbent layer thereon;
said inner portion received in said groove of said tubular body for forming an antislip layer thereon; and
said connecting portion fitted in said opening of said tubular body to connect said outer portion and said inner portion of said second body member.

2. The grip of claim 1 wherein said groove of said tubular body is extended along the axis thereof.

3. The grip of claim 1 wherein said outer portion of said second body member has a thickness selected to protect outwardly from said outer surface of said tubular body.

4. The grip of claim 1 wherein said outer portion of said second body member has an area selected to completely cover said opening.

5. The grip of claim 4 wherein said outer portion of said second body member has a grained top surface.

6. A grip for fitting over a handlebar, comprising:
a first body member made of rigid materials and shaped to fit over the handlebar, said first body member including a tubular body having an inner surface and an outer surface;
a plurality of grooves spacedly provided on said inner surface of said tubular body;
each of said grooves having a bottom wall with a plurality of openings;
a second body member made of pliable materials and having an outer portion, a connecting portion and an inner portion;
said outer portion of said second body member located on said outer surface of said tubular body for forming a shock absorbent layer;
said inner portion received in said groove of said tubular body for forming an antislip layer; and
said connecting portion fitted in said opening of said tubular body to connect said outer portion and said inner portion.

7. The grip of claim 6 wherein each of said grooves is extended along the axis of said tubular body.

8. The grip of claim 6 wherein said outer portion of said second body member has a thickness selected to project outwardly from said outer surface of said tubular body.

9. The grip of claim 6 wherein said outer portion of said second body member has an area selected to completely cover said opening.

10. The grip of claim 6 wherein said outer portion of said second body member has a grained top surface.

* * * * *